United States Patent [19]

Paek

[11] 4,266,668
[45] May 12, 1981

[54] TELESCOPING SLICED BREAD DISPENSER

[76] Inventor: Yong K. Paek, 9014 Fort Craig Dr., Burke, Va. 22015

[21] Appl. No.: 52,602

[22] Filed: Jun. 27, 1979

[51] Int. Cl.³ .................... B65D 1/34; B65D 6/04
[52] U.S. Cl. .................... 206/557; 220/345; 220/404; 220/94 A; 229/87 B; 426/128
[58] Field of Search ............ 220/345, 346, 347, 351, 220/404, 94 A; 206/557; 229/87 B; 426/128

[56]  References Cited
U.S. PATENT DOCUMENTS

| 3,145,510 | 8/1964 | Mayer et al. | 206/557 |
| 3,254,758 | 6/1966 | Guyer | 206/557 |
| 3,447,260 | 6/1969 | Abelius | 220/404 |
| 3,576,290 | 4/1971 | Marchisen | 220/404 |
| 3,629,905 | 12/1971 | Cote | 229/87 B |
| 3,853,220 | 12/1974 | Luray | 220/404 |
| 4,126,224 | 11/1978 | Laauwe et al. | 220/347 |

Primary Examiner—Joseph Man-Fu Moy
Attorney, Agent, or Firm—Gilbert L. Wells

[57]  ABSTRACT

A telescoping dispenser having two interconnecting tray portions. The first tray portion has a tray for receiving a loaf of sliced bread, a guide for a second smaller telescoping tray and a handle for gripping the dispenser above the center of gravity. The second tray portion has a flap hinged at one end with a perforation in the flap for holding the twisted end of a plastic bread wrapper.

16 Claims, 9 Drawing Figures

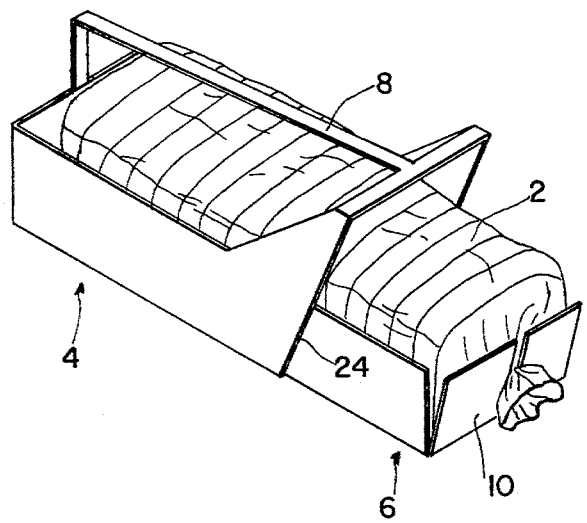
FIG. 1
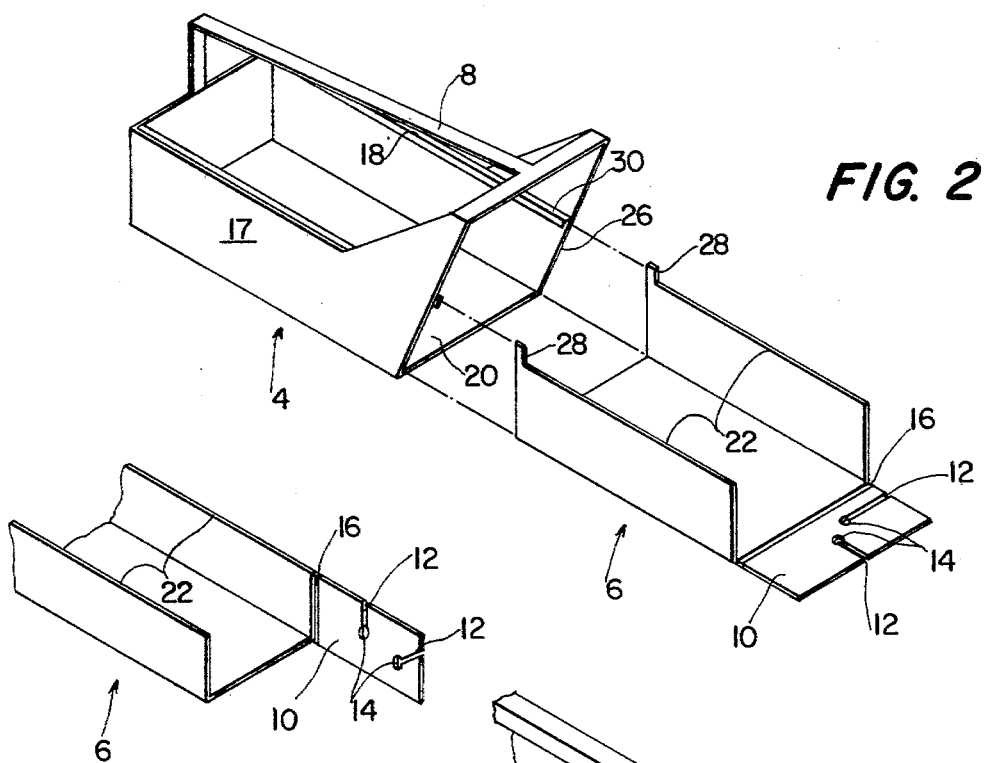
FIG. 2
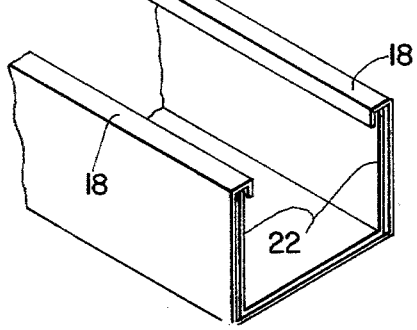
FIG. 2A
FIG. 3

TELESCOPING SLICED BREAD DISPENSER

BACKGROUND OF THE INVENTION

The field of the invention is baked goods dispensed from telescoping receptacles having bag closures and the present invention is particularly concerned with telescoping sliced bread dispensers.

Although the present invention is useful in dispensing onions, round fruit such as grapefruit, grains, square envelopes of powdered drinks and bakery products, the specific embodiments are limited to the dispensing of sliced bread protected by a cellophane, vinyl or other plastic wrapper.

Sliced bread and many other grocery products now are sold in the United States in clear plastic wrappers such as vinyl with one end secured by a wire or other wrap-around closure. The vinyl wrapper gives no support to the sliced bread and as the individual slices are removed from the package, the slices move about and are subject to being crushed and otherwise damaged.

The state of the art of sliced bread packages may be ascertained by reference to U.S. Pat. Nos. 1,816,399 and 3,146,111 of Rohwedder and Enoch, respectively. Rohwedder shows a telescoping concept, but there is no bottom to form a tray and there is no fastener or twister. Enoch shows a U-shaped reinforcing band. Neither of the references discloses the concept of a telescoping receptacle for dispensing sliced bread from a plastic wrapper having a fastener or twister for the end of the wrapper as a component of the receptacle.

SUMMARY OF THE INVENTION

Having in mind the limitations of the present art, it is an object of the present invention to dispense sliced bread from a plastic wrapper while accomodating the decrease in size of the loaf resulting from the removal of slices.

Another object of the present invention is to provide a seal for the twisted end of the bread wrapper as an integral part of the dispenser.

Yet another object of the present invention is the provision of a handle for the dispenser which maintains the center of gravity of the loaf as the size is decreased.

Still another object of the present invention is a two-piece, telescoping dispenser fabricated from low cost materials such as plastic, light metal, or wax-coated fiber board.

The objects of the present invention are achieved by a two-piece, telescoping receptacle where the first piece is a tray with lateral grooves therein having a handle and the second piece is retractable into the grooves of the first piece by lateral edges or ridges. An end portion of the second piece is hinged to the bottom or either lateral edge and has slots therein for holding and sealing the twisted end of a bread wrapper.

BRIEF DESCRIPTION OF THE DRAWINGS

The formal drawings appended hereto show embodiments of the present invention for dispensing bread, wherein:

FIG. 1 is a perspective view of one embodiment of the dispenser of the present invention with a loaf of sliced bread therein;

FIG. 2 is an exploded, perspective view of the same embodiment as FIG. 1;

FIG. 2A is another embodiment of FIG. 2;

FIG. 3 is a cross-sectional view of FIG. 1;

DESCRIPTION OF THE PREFERRED EMBODIMENTS

Figure 4:
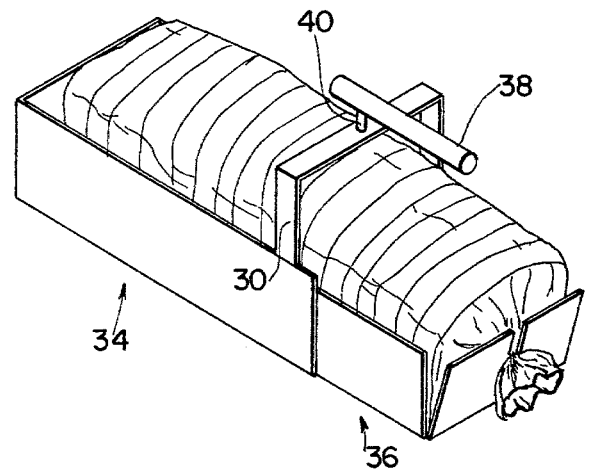
FIG. 4 is a perspective view of another embodiment of the dispenser of the present invention showing a handle pivotable about a vertical axis.

The invention is best described by reference to FIGS. 1 and 2 wherein a loaf of sliced bread 2 is dispensed from a first tray 4 into which a second tray 6 is telescoped. The first tray 4 has a handle 8 with a length equal to or greater than the length of the first tray so that the handle may be gripped at the center of gravity no matter how the load in the dispenser is distributed.

The second tray 6 has a flap 10 hinged at 16 at one end thereof and this hinged flap has at least one slot 12 running from the edge and connecting with a perforation 14 for securing and sealing the twisted end of the plastic wrapper holding a load of bread.

First tray 4 has at least one groove turned over edge or lateral surface 18 parallel to the bottom 20. The second tray is telescoped and held in the first tray by edges 22 abutting the inside surfaces of grooves 18.

In the embodiment of FIG. 1, the edges 24 are vertical but in FIG. 2, the edges 26 are at an angle of about 45 degrees. This angle is advantageous in two ways. First of all, it permits the forward end of handle 8 to extend beyond the bottom edge 20 of the tray so that it may be gripped further forward in balancing the center of gravity. Secondly, the angled edge permits the insertion of the second tray 6 having projections 28 thereon into grooves 18 having keepers 30 at the leading end thereof for securing tray 6 in tray 4.

In the embodiment of FIG. 4, the first tray 34 has a second tray 36 telescoping thereinto. A first U-shaped handle portion 30 is secured to or integral with the sides of tray 34 and a second handle portion or grip 38 is pivoted by a bolt or rivet 40 about the highest point of the first handle portion 30. The advantage of this arrangement is that the second handle portion or grip may be pivoted over the center of gravity as the length of the dispensed material decreases and the load distribution changes.

Figure 5:
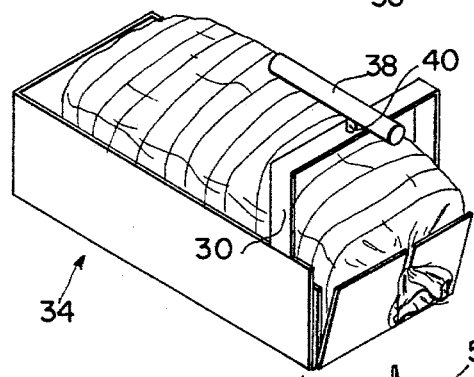
FIG. 5 shows the dispenser of FIG. 4 with the trays telescoped after a portion of the sliced bread has been dispensed.

FIG. 5 illustrates the embodiment of FIG. 4 with the size of the loaf of bread decreased and the grip 38 rotated to compensate for the shift in load distribution.

Figure 6:
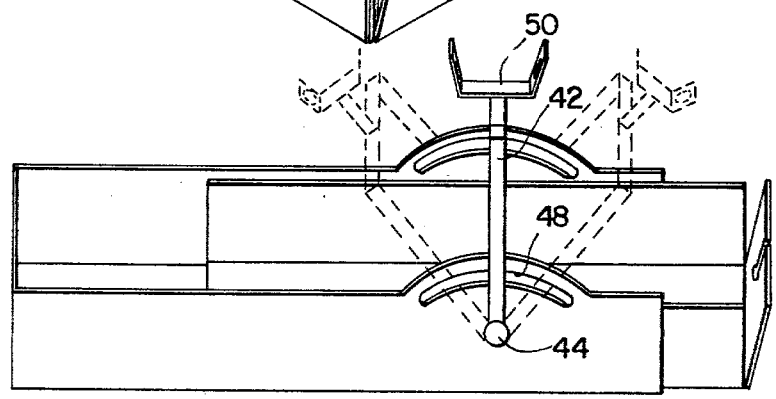
FIG. 6 shows still another embodiment of the present invention with the handle pivotable about a horizontal axis.
Figure 7:
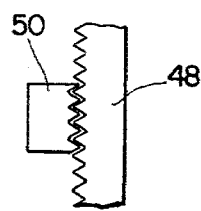
FIG. 7 is a detailed view from above of FIG. 6 showing friction teeth for securing the handle at different angles of rotation.

FIG. 6 shows a handle arm pivotable about a horizontal pin, a bolt or rivet 44 where the pin 44 is secured to the side of the tray through hole 46. An arc of teeth 48 secures the teeth 50 on the inside of the handle arm 42 so that the handle arm is adjustable through an angle of about 90 degrees. Positions A, B and C illustrate examples of how the handle is rotated in order to place the grip over the center of gravity during changes in load distribution.

Figure 8:
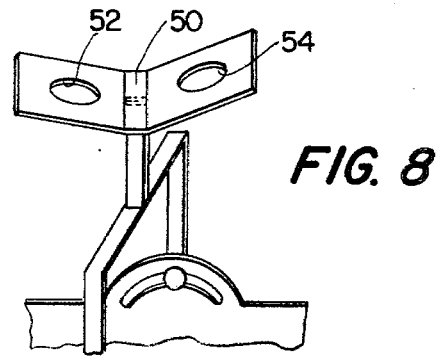
FIG. 8 is a detailed showing of the upper portion of the handle of FIG. 6.

The grip 50 of FIG. 6 is shown in detail in FIG. 8 as having perforations or finger holes 52 and 54.

BEST MODE OF CARRYING OUT THE INVENTION

In the best mode of carrying out the invention, the embodiment of FIG. 1 is fabricated by extrusion molding from polyethylene or polypropylene in two parts. The first part 4 has the handle 8 and ridges 18 molded to the upper edge of the sides 17. The second part has the lateral upper edges held in position for telescoping by ridges 18. The flap 10 is hinged at 16 by having the thickness at 16 molded thinner to promote bending. One slot 12 parallel to the lateral edges and one connecting perforation 14 are molded into the flap 10.

A loaf of sliced bread is placed in the dispenser with the second part 6 extended to the end of the loaf having a twister. The twister is removed from the plastic wrapper and the twisted end of the wrapper is inserted through slot 12 and lodged in perforation 14.

As slices of bread are removed from the loaf, the twisted end is removed from the perforation and slot, unravelled and slices are removed. The plastic wrapper is again twisted and the second part is telescoped into the first part to compensate for the decrease in size of the loaf and the twisted end is again inserted in the slot 12 and lodged in the perforation 14.

The above procedure is repeated until all of the bread is exhausted. The handle 8 having a length longer than the first part 4 is grippable at any position along its length to compensate for the change in the center of gravity resulting from the change in load distribution as the bread is removed.

I claim:

1. A telescoping dispensing tray for holding the end of a twisted plastic wrapper comprising:
    (a) a first tray portion having a bottom, two sides, an end connected to said two sides and bottom and an open end;
    (b) a handle connected to said first tray portion;
    (c) a second tray portion having a second tray bottom, two second tray sides connected to said second tray bottom and a second tray end hinged to said second tray bottom;
    (d) said hinged second tray end having means for securing and sealing said end of a twisted plastic wrapper comprising a perforation located in said hinged second tray end and a slot connecting said perforations and an edge of said hinged second tray end; and
    (e) said first tray portion having means for guiding said second tray portion into telescoping relationship.

2. The dispensing tray of claim 1, wherein said means for securing the end is a plurality of said perforations and slots.

3. The dispensing tray of claim 1, wherein said means for guiding are grooves on the upper portion of said two sides parallel to said bottom engaging the upper edges of said two second tray sides.

4. The dispensing tray of claim 3, having first stop means of said grooves at said open end and second stop means of said upper edges for limiting the range of telescoping of said first and second tray portions.

5. The dispensing tray of claim 1, wherein said handle has a first post attached to the upper edge of said end and second and third posts attached to the upper edges of said two sides.

6. The dispensing tray of claim 5, wherein said second and third posts depart from the vertical away from said open end.

7. The dispensing tray of claim 1, wherein said handle comprises an inverted U connected to the upper edges of said two sides, pivot means on said inverted U and a hand grip attached to said pivot means.

8. The dispensing tray of claim 1, wherein said handle has pivot means on said two sides, a first end of said handle connected to said pivot means, a second end of said handle having finger grasping means and means between said handle and said two sides for maintaining said handle at any given angle to the vertical.

9. A telescoping dispensing tray for holding the end of a twisted plastic wrapper comprising:
    (a) a first tray portion having a bottom, two sides, an end connected to said two sides and bottom and an open end;
    (b) a handle connected to said first tray portion;
    (c) a second tray portion having a second tray bottom, two second tray sides connected to said second tray bottom and a second tray end hinged to one of said second tray sides;
    (d) said hinged second tray end having means for securing and sealing said end of a twisted plastic wrapper comprising a perforation located in said hinged second tray end and a slot connecting said perforations and an edge of said hinged second tray end; and
    (e) said first tray portion having means for guiding said second tray portion into telescoping relationship.

10. The dispensing tray of claim 9, wherein said means for securing and sealing the end is a plurality of said perforations and slots.

11. The dispensing tray of claim 9, wherein said means for guiding are grooves on the upper portion of said two sides parallel to said bottom engaging the upper edges of said two second tray sides.

12. The dispensing tray of claim 11, having first stop means on said grooves at said open end and second stop means on said upper edges for limiting the range of telescoping of said first and second tray portions.

13. The dispensing tray of claim 9, wherein said handle has a first post attached to the upper edge of said end and second and third posts attached to the upper edges of said two sides.

14. The dispensing tray of claim 13, wherein said second and third posts depart from the vertical away from said open end.

15. The dispensing tray of claim 9, wherein said handle comprises an inverted U connected to the upper edges of said two sides, pivot means on said inverted U and a hand grip attached to said pivot means.

16. The dispensing tray of claim 9, wherein said handle has pivot means on said two sides, a first end of said handle connected to said pivot means, a second end of said handle having finger grasping means and means between said handle and said two sides for maintaining said handle at any given angle to the vertical.

* * * * *